United States Patent
Salinger (12)

(10) Patent No.: US 6,212,229 B1
(45) Date of Patent: Apr. 3, 2001

(54) ADAPTIVE PRE-EMPHASIS TECHNIQUE

(75) Inventor: Sheldon Norman Salinger, Los Altos, CA (US)

(73) Assignee: General Dynamics Government Systems Corporation, Needham, MA (US)

( * ) Notice: Subject to any disclaimer, the term of this patent is extended or adjusted under 35 U.S.C. 154(b) by 0 days.

(21) Appl. No.: 09/212,617

(22) Filed: Dec. 16, 1998

(51) Int. Cl.[7] ............................. H04B 3/46; H01B 1/22
(52) U.S. Cl. ................................... 375/224; 333/81 R
(58) Field of Search ................................. 375/224, 130, 375/219, 295, 220, 222, 221, 345; 455/73, 182.1, 182.2, 67.4; 333/160, 81 R

(56) References Cited

U.S. PATENT DOCUMENTS

| | | | |
|---|---|---|---|
| 3,838,348 | * 9/1974 | Pezzutti | 328/167 |
| 3,940,694 | 2/1976 | Price et al. | 325/42 |
| 4,291,277 | 9/1981 | Davis et al. | 330/149 |
| 4,462,001 | 7/1984 | Girard | 330/149 |
| 4,555,790 | 11/1985 | Betts et al. | 375/39 |
| 4,587,498 | 5/1986 | Bonnerot et al. | 329/122 |
| 4,615,038 | 9/1986 | Lim et al. | 375/14 |
| 4,731,816 | 3/1988 | Hughes-Hartogs | 379/98 |
| 4,805,191 | 2/1989 | Burch et al. | 375/11 |
| 4,827,431 | 5/1989 | Goldshtein | 364/514 |
| 4,890,300 | 12/1989 | Andrews | 375/60 |
| 4,969,160 | * 11/1990 | Kingston | 375/200 |
| 4,980,897 | 12/1990 | Decker et al. | 375/38 |
| 4,995,057 | 2/1991 | Chung | 375/13 |
| 4,996,497 | * 2/1991 | Waehner | 330/151 |
| 5,105,445 | 4/1992 | Karam et al. | 375/60 |
| 5,107,520 | 4/1992 | Karam et al. | 375/60 |
| 5,113,414 | 5/1992 | Karam et al. | 375/60 |
| 5,148,448 | 9/1992 | Karem et al. | 375/60 |

(List continued on next page.)

OTHER PUBLICATIONS

T. Suzuki et al., Line Equalizer for a Digital Subscriber Loop Employing Switched Capacitor Technology, IEEE Trans. on Communications, vol. COM–30, No. 9, p. 2074–82.

O. Agazzi, Timing Recovery in Digital Subscriber Loops, IEEE Trans. on Communications, vol. COM–33, No. 6, p. 558–69.

F.M. Gardner, A BPSK/ZPSK Timing–Error Detector for Sampled Receivers, IEEE Trans. on Communications, vol. COM–34, No. 5, p. 423–9.

M.H. Meyers, Robust Control of Decision Directed Loops, IEEE CH2655–9/89/0000–1030, p. 1030–1036.

H. Sari et al., New Phase and Frequency Detectors for Carrier Recovery in PSK and QAM Systems, IEEE Trans. on Communications, vol. 36, No. 9, p. 1035–1043.

(List continued on next page.)

*Primary Examiner*—Chi H. Pham
*Assistant Examiner*—Khai Tran
(74) *Attorney, Agent, or Firm*—Jenner & Block

(57) ABSTRACT

A method and apparatus are described for adaptively pre-emphasizing signals transmitted over a stable but occasionally varying transmission medium such as a very-high-speed digital subscriber line (VDSL) signal, before it is transmitted by a transmitter, in order to compensate for frequency distortion that is introduced by the VDSL transmission line. At system start up, or whenever the parameters or configuration of the line are changed, the the line termination transceivers at both ends of the transmission line exchange calibration signals to measure the attenuation-versus-frequency curves of the line in both directions. Thereafter, whenever the signal transmission band is to be changed in either direction, the transmitter for that direction uses the measured attenuation curve for the line to calculate and design a set of filter coefficients for an adjustable pre-emphasis filter. The pre-emphasis filter filters the transmitted signal, attenuating most heavily those frequencies that are least attenuated by the transmission line, so that the net frequency response of the pre-emphasis filter plus transmission line is flat, thereby eliminating frequency distortion.

20 Claims, 5 Drawing Sheets

U.S. PATENT DOCUMENTS

| | | | |
|---|---|---|---|
| 5,249,200 | 9/1993 | Chen et al. | 375/58 |
| 5,251,328 | 10/1993 | Shaw | 455/73 |
| 5,285,474 | 2/1994 | Chow et al. | 375/13 |
| 5,295,138 | 3/1994 | Greenberg et al. | 370/57 |
| 5,313,467 | 5/1994 | Varghese et al. | 370/94.1 |
| 5,339,054 | 8/1994 | Taguchi | 332/100 |
| 5,394,392 | 2/1995 | Scott | 370/24 |
| 5,479,447 | 12/1995 | Chow et al. | 375/260 |
| 5,497,505 | 3/1996 | Koohgoli et al. | 455/34.1 |
| 5,519,356 | 5/1996 | Greenberg | 329/340 |
| 5,548,809 | 8/1996 | Lemson | 455/34.1 |
| 5,572,553 | 11/1996 | Kimiavi et al. | 375/344 |
| 5,606,577 | 2/1997 | Grube et al. | 375/295 |
| 5,621,767 | 4/1997 | Brandt et al. | 375/344 |
| 5,673,290 | 9/1997 | Cioffi | 375/260 |
| 5,694,440 | 12/1997 | Kallman et al. | 375/355 |
| 5,705,958 | 1/1998 | Janer | 332/103 |
| 5,710,766 | 1/1998 | Schwendeman | 370/329 |
| 5,726,978 | 3/1998 | Frodigh et al. | 370/252 |
| 5,732,333 | 3/1998 | Cox et al. | 455/126 |
| 5,751,766 | 5/1998 | Kletsky et al. | 375/224 |
| 6,002,671 * | 12/1999 | Kahkoska et al. | 370/248 |

OTHER PUBLICATIONS

H. Sari et al., A New Class of Frequency Detectors for Carrier Recovery in QAM Systems, IEEE CH2314–3/86/0000–0482, p. 482–486.

R. Brown et al., Draft Interface Specification for a CAP Based RADSL System.

G. Karam et al., A Data Predistortion Technique with Memory for QAM Radio Systems, IEEE Trans. on Communications, vol. 39, No. 2, p. 336–344.

Welch, Peter D., "The Use of Fast Fourier Transform for Estimation of Power Spectra: A Method Based on Time Averaging over Short, Modified Periodograms", IEEE Transactions on Audio and Electtroacoustics; vol. AU–15, No. 2, Jun. 1967, pp 70.

* cited by examiner

ADAPTIVE PRE-EMPHASIS TECHNIQUE

FIELD OF THE INVENTION

The present invention generally relates to the field of data communications and more specifically, to a method and apparatus for automatically compensating the transmission of a data signal over a transmission medium by pre-emphasizing the most attenuated parts of the signal spectrum prior to transmission resulting in a received signal having a flat spectrum free of frequency distortion.

BACKGROUND OF THE INVENTION

To meet the growing need for ever increasing digital data bandwidth for new subscriber services (e.g., high-data-rate internet service, video telephony, and high definition TV (HDTV)), telephone companies are looking towards the use of very-high-speed digital subscriber lines (VDSL) as a means to carry such data into the home over the existing copper wires used by plain old telephone service (POTS). VDSL may carry digital data at bit rates up to 52 Mbps using quadrature amplitude modulation (QAM), with modulation constellations of up to 256 symbol points and symbol rates up to 6480 kbaud. The signals are carried within a frequency range reaching 30 MHz, which is above the frequency band used by POTS on the same copper wire pair. Due to the high loss of the copper telephone wires at these frequencies, the VSDL signals are carried on the telephone wires only over the "last mile" (i.e., the last segment of copper wire between a central location and the user's premises). The high-speed digital data is typically carried over a fiber-optic cable network from high-data-rate digital servers to a distribution point where this last mile of copper wire begins. As shown in FIG. 1, the VDSL copper wire is connected to the fiber optic cable 2 by an interface known as a VDSL Transmission Unit, for example, an optical VDSL terminal unit, VTU 4 (VTU-O). At the subscriber's premises, the VDSL line is terminated and interfaced to the subscriber's terminal equipment 22 (e.g., computers, video telephones, HDTV) by an interface known as a VDSL Terminal Unit, for example, a remote VTU 22 (VTU-R).

Within the VDSL frequency range, it has been found that the loop attenuation function for twisted-pair transmission line, in dB/mile, varies as $\sqrt{f}$ for frequencies above 300 kHz on a 26-gauge twisted-pair line, and for frequencies above 200 kHz on a 24-gauge line (see Jean-Jacques Werner, "The HDSL Environment", *IEEE Journal on Selected Areas in Communications*, Vol. 9, No. 6, August 1991, pp. 785–800). This result, as confirmed by simulations of various VDSL test cases, shows that the line attenuation at 30 MHz may be as much as 200 dB more severe than at audio frequencies. In addition, twisted-pair telephone lines may include bridged taps, which are open-circuited twisted pairs that are connected in shunt with working twisted pairs. Bridged taps are sometimes added to telephone lines to provide plant flexibility for future additions and changes in service demands. A bridged tap causes delayed reflections of the transmitted VDSL signal back from the end of the bridged tap and into the main transmission line. These delayed reflections add to the direct signal propagating from transmitter to receiver, resulting in a multipath effect that may cause deep nulls in frequency bands where the reflected signal from the bridged tap has opposite phase sense from the direct path signal, as is illustrated in FIG. 2. A VDSL signal, with typical bandwidth of a few Megahertz, will suffer severe frequency distortion as a result of the great difference in attenuation from the low to high edges of its transmission band due to the $\sqrt{f}$ frequency dependence of the line attenuation. This may be further compounded if the signal's transmission band overlaps a bridged tap null. This frequency distortion will cause intersymbol interference which will degrade the probability of bit error and may result in inadequate quality of service.

In principle, an adaptive equalizer at the receiver can correct the frequency distortion caused by the VDSL transmission line while correcting for other distortions that may occur on the received signal. However, in practice, the very large frequency-dependent attenuations in a VDSL transmission line, along with other distortions, often prove to be too much for a reasonably sized equalizer to compensate in a short adaptation time. Therefore, it is advantageous to compensate these frequency distortions by pre-emphasis of the attenuated frequencies prior to transmission, in exact proportion to the amount of attenuation at each frequency, so that the attenuation function of the signal received at the receiver is reasonably flat. The pre-emphasis need not be exact, but to the extent that it can compensate for most of the fixed frequency-dependent attenuation, it places a much smaller processing load on the equalizer, enabling a shorter, simpler and less costly equalizer to be used.

Thus, what is needed is a method and apparatus for automatically compensating the transmission of a wide band data signal over a stable but occasionally varying transmission medium, such as a transmission line, for the distorting effects of non-uniform attenuation over the available bandwidth of the transmission medium when the frequency band of the data signal may from time to time change within that available bandwidth. This can be accomplished by pre-emphasizing the most attenuated parts of the signal spectrum prior to transmission, so that the received signal has a flat spectrum that will not cause frequency distortion.

SUMMARY OF THE INVENTION

According to a preferred embodiment of the present invention, a method in a transmission medium is provided for adaptively pre-emphasizing a transmitted signal in forward and reverse directions. The method includes the step of measuring an attenuation-versus-frequency characteristic of a transmitted signal over a predetermined bandwidth of a transmission medium channel, and determining an inverse of the measured attenuation-versus-frequency characteristic. The inverted attenuation-versus frequency characteristic is stored in memory. Next, filter coefficients for a pre-emphasis filter based on the stored inverted attenuation-versus-frequency characteristic is designed.

The transmitted signal is pre-emphasized such that a cascade of the pre-emphasis filter and the transmission medium channel has a substantially flat attenuation versus frequency curve.

The present invention will become more apparent from the Brief Description of the Drawings and Description of Preferred Embodiments.

DESCRIPTION OF PREFERRED EMBODIMENTS

The present invention characterizes a line transmission function and then automatically adjusts parameters of a pre-emphasis filter at a transmitter whenever there is a change in a center frequency or bandwidth of a transmitted VDSL signal. Simulations have shown that the phase shift of all VDSL lines remains linear with frequency over the entire 0.2 MHz to 30 MHz range of a typical VDSL transmission in spite of the presence of wire gauge changes, bridged taps and other reflections. Therefore, pre-emphasis is needed only to compensate attenuation-vs.-frequency variation. The present invention relies on the fact that the frequency attenuation curve of a VDSL transmission line remains invariant as long as the line is not modified, and the method is applied to a VDSL signal that may frequently be changed in center frequency and bandwidth within the total allocated VDSL bandwidth. Defining this total allocated bandwidth as a passband is not practical since there may be a smooth 200 dB change in attenuation over the entire band. Furthermore, it is desired to successfully transmit the signal in frequency regions where there is so much attenuation that one might otherwise consider these regions to be "stop bands".

A VDSL signal will be used hereinafter for exemplary purposes, but one skilled in the art will recognize that the present invention is not limited to a single signal type. For example, other signal types include: high-speed digital subscriber line (HDSL); asymmetric digital subscriber line (ADSL); integrated services digital network (ISDN); a broadband ISDN (B-ISDN); and high-definition television (HDTV). Additionally, the concept and means of operation of the present invention can be directly extended to the situation of a satellite communication system in which up-link transmission signals may be transponded through any one of several frequency channels on more than one satellite.

Figure 1:
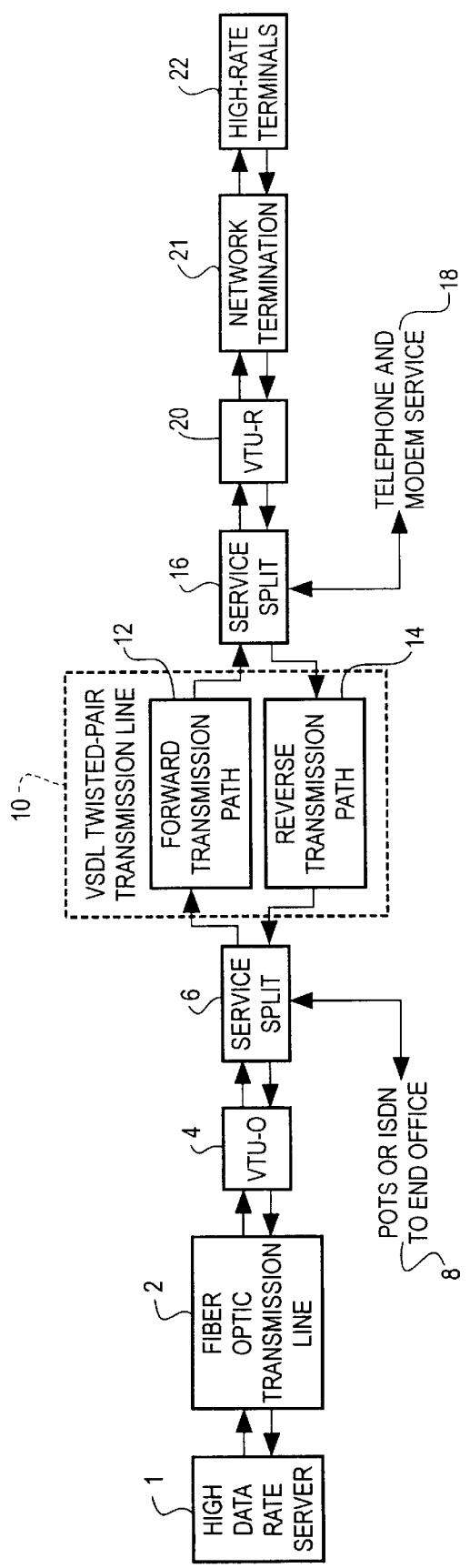
FIG. 1 is a block diagram of a generic VDSL communication system to which the present invention applies.

FIG. 1 shows the present invention as it applies to a fiber-optic communication line 2 in a VDSL communication system having a high-data-rate server 1 originating at one end and terminating at the other end in high data rate terminals 22 at the subscriber's premises. Wideband digital data arriving on the fiber-optic transmission line 2 from high-data-rate server 1 is converted to a VDSL electrical signal in the Optical VDSL Terminal Unit (VTU-O) 4. The VDSL signals are transmitted, for example, in the frequency band 0.2 MHz to 30 MHz. At a service split 6, plain old telephone service (POTS) signals and/or integrated services digital network (ISDN) signals 8 from the public switched telephone network (PSTN) local end switching office are combined with the VDSL signal. The POTS and ISDN signals 8 are carried in the frequency band below 0.2 MHz. The VDSL signal is carried to the subscriber's premises over a forward transmission path 12 on a VDSL twisted-pair transmission line 10. The VDSL twisted pair line 10 is actually just one of several VDSL twisted pairs in a cable originating at the site of the VTU-O 4 and terminating at several VTU-Rs in the neighborhood of the subscriber's premises, including the VTU-R 20 of this particular subscriber. In fact, each twisted pair in the cable, going to each subscriber in the neighborhood, will originate in its own VTU-O 4 at the site.

From the transmission line 10, the incoming signals go to a second service splitter 16, where the POTS and ISDN signals are split off and directed to the subscriber's telephone 18 and computers (the latter through the use of conventional telephone modems and ISDN terminals, not shown). Following the service split, the VDSL signal goes to the remote VDSL Terminal Unit (VTU-R) 20, located on the subscriber's premises. Here the VDSL signal is demodulated and converted into a bit stream. This bit stream is sorted, in the network termination 21, into individual bit streams that are directed to various high-data-rate terminal devices 22 on the subscriber's premises. Simultaneously, wideband data may be carried in the reverse direction, from high-data-rate terminal devices 22 on the subscriber's premises to high data rate server 1, through VTU-R 20 and VTU-O 4, over the reverse transmission path 14 on the VSDL twisted-pair transmission line 10. The forward and reverse path signals occupy different and varying sub-bands of the overall VDSL frequency band. In addition to the payload data (e.g., computer, high-definition television, video telephone, or high fidelity audio data), the forward and reverse path VDSL signals also carry control data for operation of the VDSL system.

Figure 2:
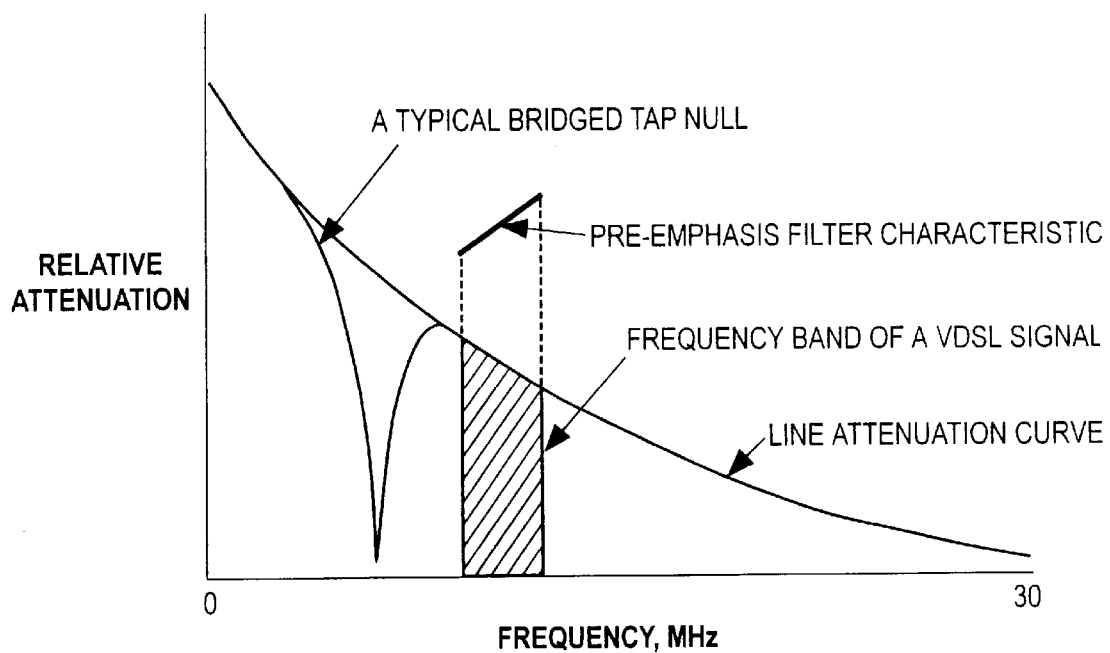
FIG. 2 is an illustration of a typical VDSL transmission line attenuation curve, VDSL signal band, pre-emphasis characteristic, and a typical bridged tap null.

FIG. 2 illustrates a typical VDSL line attenuation curve, the transmission band of a typical signal, and the pre-emphasis function that must be applied to that signal. Although FIG. 2 shows a single null due to a bridged tap, a bridged tap will actually cause a series of nulls periodically spaced along the entire transmission frequency spectrum, with the nulls occurring at frequencies for which the bridged tap's length is equal to an odd number of quarter wavelengths for propagation along the bridged tap line branch.

According to the present invention, measurements are made to characterize the attenuation curve of the VDSL line either over a predetermined frequency range or over its entire frequency range (nominally 0–30 MHz). The characterization is performed when the line is first installed, first converted to VDSL operation, or physically modified in any way thereafter. In this measurement, the VTU-O 4 network interface (the fiber-optic end terminal box serving all subscribers in an entire neighborhood, see FIG. 1) transmits in sequence a set of several frequencies spaced relatively uniformly over the VDSL frequency band. Transmission frequencies of narrow-band interferers such as AM radio broadcasts and amateur radio transmissions can be omitted in this process since they would not be useful. If there are bridged taps on the line, which may cause reflections and deep nulls in certain frequency bands, additional attenuation measurements may be required in the frequency region affected by the bridged tap. In these measurements, the VTU-O 4 tracks the power levels of all transmitted test signals. The VTU-R 20 at the subscriber end of the VDSL line measures the received signal powers, and transmits these measurement values back to the VTU-O 4, where the ratio of transmitted to received power, or their difference in decibels, is taken to determine the attenuation at each test frequency. If a received power measurement is too low (too close to the noise level) to be accurate, the VTU-R 20 so informs the VTU-O 4, which then repeats the transmission at a higher power level until an accurate measurement of received power can be made.

When the VTU-O 4 has determined the attenuation values at all test frequencies, the VTU-O 4 uses these values in an interpolation routine to determine a smooth function of attenuation over the entire VDSL frequency band. Thereafter, whenever, the VDSL signal transmission frequency or bandwidth are changed to any value within the allowed range, the attenuation curve over the new transmission band is noted. The inverse of that attenuation curve (in linear units) is the pre-emphasis curve needed to correct for the non-uniform attenuation over the transmission band of the VDSL signal. Software within the VTU-O 4 then either selects or designs a digital finite-impulse-response (FIR) pre-emphasis filter with that inverse attenuation function over the entire bandwidth of the signal, as determined by its symbol rate and modulation type. The filter coefficients of an adjustable pre-emphasis filter are then adjusted to match those of the computed filter. The transmitter in the VTU-O 4 then passes the VDSL signal through the pre-emphasis filter with these characteristics until such time that the signal center frequency and bandwidth must be changed, at which time new pre-emphasis filter characteristics are calculated from the stored attenuation curve and then applied to the modified signal. Any residual frequency distortion not removed by the pre-emphasis filter will then generally be small enough to be handled with reasonable efficiency by an adaptive equalizer in the receiver.

For reverse path (upstream) transmissions from the VTU-R 20 to the VTU-O 4, the overall transmission characteristics on the transmission line, including depth and locations of bridged tap nulls, are the same as for the forward path, since the transmission line comprises only linear components. To characterize the reverse path, either the same measurements that were made for the forward path can be used, or a separate set of measurements may be made in the reverse direction. In the latter case, the VTU-O 4 selects a set of test frequencies, commands the VTU-R 20 to transmit them in sequence with specified power levels, measures the received powers, and computes the reverse path attenuation curve. The VTU-O 4 then selects or designs a set of pre-emphasis filter coefficients for any reverse path VDSL transmission, sends these parameters to the VTU-R 20 via the forward path, and commands the VTU-R 20 to reset its pre-emphasis filter coefficients to the new values before commencing reverse path signal transmission. Alternatively, the VTU-R 20 may transmit a preselected sequence of test frequencies, and the measured responses at the VTU-O 4 are returned to the VTU-R 20, which then computes the attenuations. The VTU-R 20 would then design its own set of pre-emphasis filter coefficients.

In the case of a satellite transponder medium, a VTU-O is replaced by the central ground station terminal, the VDSL line is replaced by the satellite transponder, and a VTU-R is replaced by the remote user ground terminal. Alternatively, the VTU-O could also represent another remote user in communication with the first one through the satellite transponder. At initial system setup when the satellite and user ground terminal are first placed into operation, and and at regular intervals thereafter when the transponder characteristics may have changes with age, or when the user terminal is directed or chooses to communicate through another satellite, calibration measurements are made, in the manner described above, to determine the attenuation versus frequency response of the entire satellite transponder bandwidth. Thereafter, whenever the remote user ground transmitter is directed to use a different frequency channel on the transponder, the remote user ground transmitter will calculate new coefficients for the pre-emphasis filter and apply them to filtering the transmitted signal to flatten out the received signal on the downlink. The same procedure can also be used in the other direction by the central ground station, or by another user ground station in direct communication with the first user ground station via the satellite transponder.

Once a VDSL transmission line is set up, the attenuation function will thereafter remain invariant unless: the line itself is changed; existing bridged taps are connected to new telephones or other communication equipment; or new bridged taps are inserted. Therefore, the line has to be characterized and the attenuation function measured only at initial VDSL setup, when change orders are implemented, or when faults (e.g., downed wires, short or open circuits) have been detected (i.e., the subscriber complains of poor or no service). Thereafter, whenever the VDSL transmission band parameters (center frequency and bandwidth) are changed, the line attenuation function over the new passband must be compensated by pre-emphasis to flatten out the attenuation function of the received signal. This requires resetting the parameters of the pre-emphasis filter whenever there is a change in the transmission band. Care must also be exercised to not pre-emphasize the high frequencies so much that the subscriber line has excessive egress radiation or excessive crosstalk coupling to other lines in the twisted-pair bundle at high frequencies.

A similar need for variable pre-emphasis occurs in satellite communications where a ground transmitter uplink signal may be transponded at any one of several different carrier frequencies through any one of several communication satellite transponders. The satellites may or may not have identical transponder frequency responses, but transmission channels near the edges of the transponder passbands will frequently have attenuation characteristics that vary over the channel bandwidth. From call to call, the ground transmitter may be directed to different transmission channels that have different attenuation characteristics. Variable pre-emphasis would serve to flatten out the received signal transmission irrespective of which satellite of transponder channel the transmission took place on.

Figure 3:
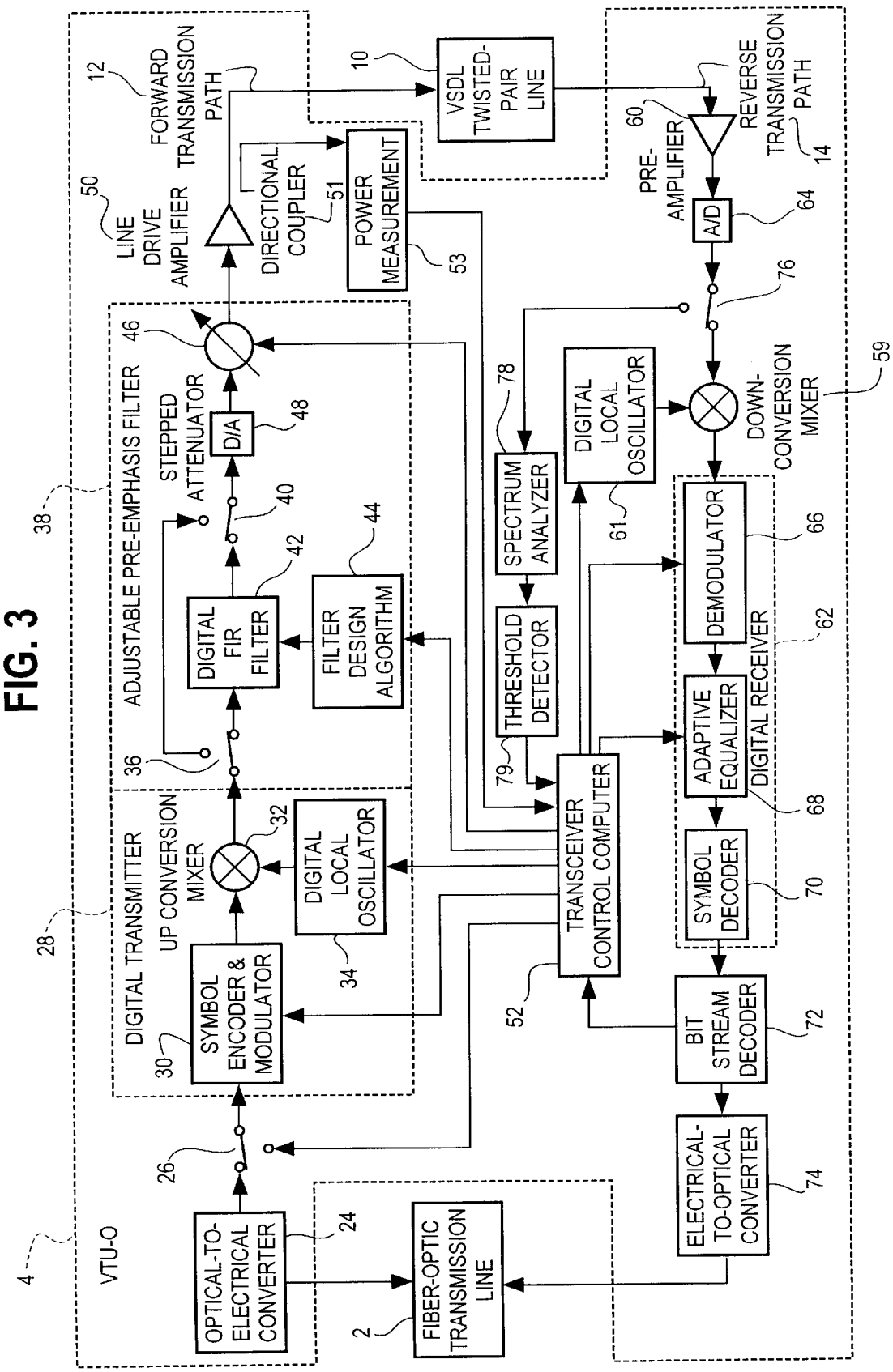
FIG. 3 is a block diagram of the VTU-O in the configuration that is used in this invention.

FIG. 3 shows a block diagram of the VTU-O 4 in the configuration that is used in the present invention. The optical digital data enter the VTU-O 4 from fiber-optic transmission line 2. There, the optical digital signal is converted to an electrical bit stream in optical-to-electrical converter 24. In digital transmitter 28, this electrical bit stream is encoded into quadrature amplitude modulated (QAM) symbols and translated to a carrier frequency determined by digital local oscillator 34. The QAM signal then enters adjustable pre-emphasis filter 38, which distorts the frequency spectrum of the signal in exactly the opposite manner of the frequency distortion induced by the combination of line driver amplifier 50, VDSL twisted-pair line 10, and preamplifier 80 (see FIG. 4). The signal out of adjustable pre-emphasis filter 38 is amplified by line driver amplifier 50 and then sent along forward transmission path 12 over VDSL twisted pair 10 to VTU-R 20 (FIG. 4).

Figure 4:
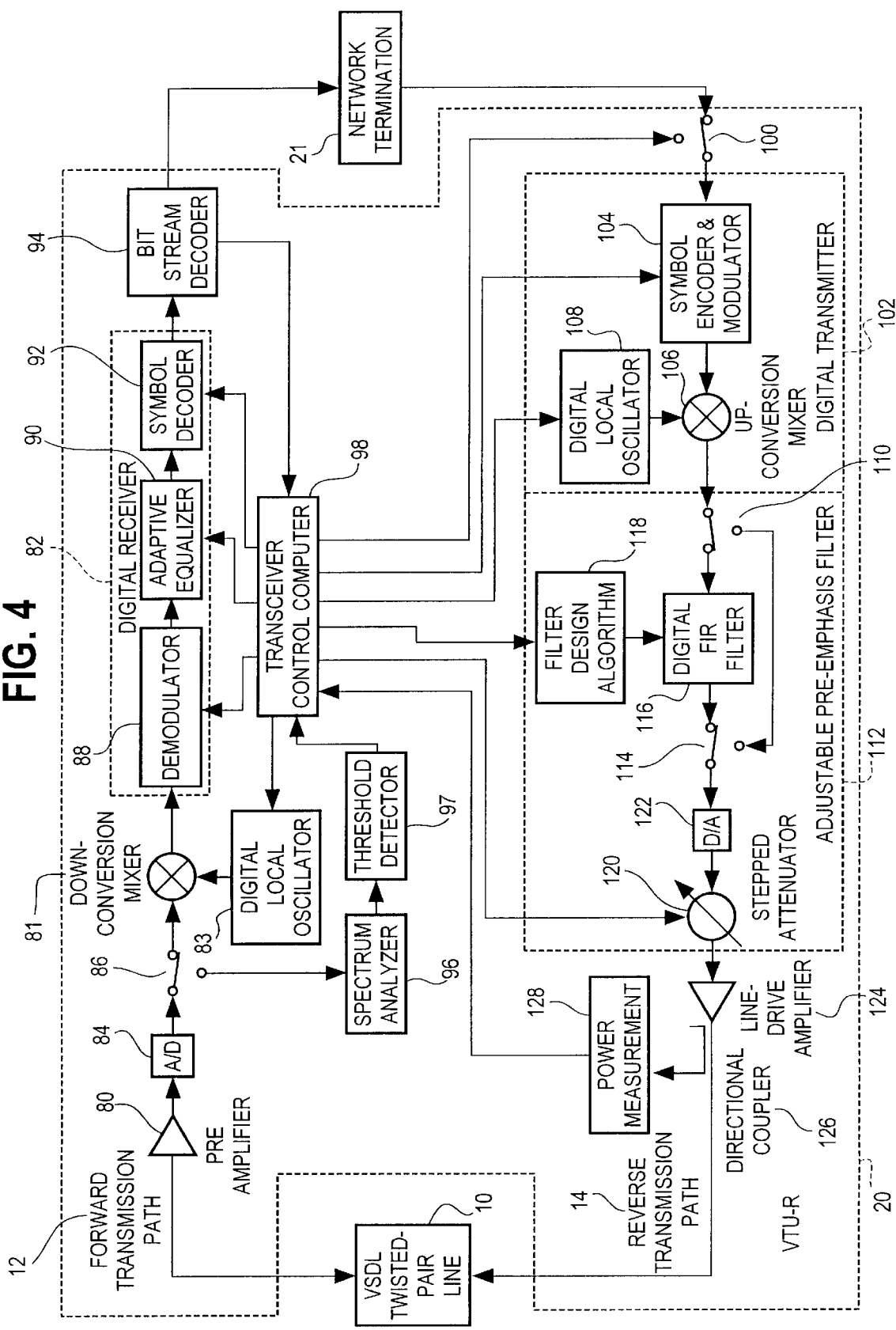
FIG. 4 is a block diagram of the VTU-R in the configuration that is used in this invention.

FIG. 4 shows a block diagram of the VTU-R 20 in the configuration that is used in the present invention. There, the signal received from VDSL twisted pair 10 is amplified by preamplifier 80, which may include an automatic gain control, and is then demodulated and decoded in digital receiver 82 which is made up of series connected circuits demodulator 88, adaptive equalizer 90 and symbol decoder 92. Then, after recovering the transmitted bit stream in bit stream decoder 94, the payload part of the bit stream is sent to network termination 21 for distribution to the various high-rate digital terminal devices 22 on the subscriber's premises.

In the reverse direction, digital signals from the high-rate digital terminal devices 22 (FIG. 1) on the subscriber's premises are combined in network termination 21 and passed to VTU-R 20. There they are encoded into QAM symbols and translated to a carrier frequency by digital transmitter 102 (FIG. 4), which is identical to digital transmitter 28 (FIG. 3). The modulated signal is pre-emphasized in the adjustable pre-emphasis filter 112, which is identical to adjustable pre-emphasis filter 38, amplified by line driver amplifier 124, and then sent along reverse path 14 over VDSL twisted pair transmission line 10 to VTU-O 4. There it is amplified by preamplifier 60, which may include an automatic gain control, and demodulated and decoded by digital receiver 62, which is identical to digital receiver 82. After recovering the transmitted bit stream in bit stream decoder 72 and converting the bit stream to an optical signal in electrical-to-optical converter 74, the converted bit stream is sent over fiber-optic transmission line 2 to high-data-rate server 1 for routing to its final destination(s).

Alternatively, the pre-emphasis filters 38 and 112 may be placed before the respective upconversion mixers 32 and 106, thereby performing the pre-emphasis at baseband to reduce the clock requirements needed to do the filtering at the intermediate frequency (IF). The invention will work equally well in either case.

At initial system setup, and whenever a modification of the VDSL line occurs, or there is a line fault (open or short circuit), the system enters a startup mode in which data are transferred over both the forward transmission path 12 and reverse transmission path 14 using a relatively low order QAM constellation, say 16-QAM, with a relatively low symbol rate and small bandwidth unlikely to be affected by frequency distortion. Forward and reverse carrier frequencies are selected to have a high probability of being free of radio frequency interference (RFI), with these carrier frequencies set low enough to assure that the signals will get across the VSDL twisted-pair line 10 with minimal attenuation to assure reliable reception. During this startup mode, digital FIR filters 42 and 116 are bypassed by switches 36, 40, 110, and 114 to provide flat passbands (no pre-emphasis) over the bandwidths of the signals used to initially communicate between the VTUs 4 and 20. Also, stepped attenuators 46 and 120 are set for minimum attenuation to assure that the setup information signals will reliably get across VSDL twisted-pair line 10 at the initial carrier frequencies. Transceiver control computer (TCC) 52, in the VTU-O 4 is considered to be the primary computer, initiating control sequences and making decisions on all control, timing sequences, and frequency selections that require coordination between itself and the VTU-R 20.

After initial "handshaking" protocols between the VTU-0 4 and the VTU-R 20, TCC 52 in VTU-O 4 sends a command to TCC 98 in VTU-R 20 directing the latter to set switch 86 "down" to activate spectrum analyzer 96 and threshold detector 97. TCC 52 then turns off its line driver amplifier 50. With no data coming across the forward transmission path 12, preamplifier 80 then sees only whatever RFI may be entering the VDSL twisted-pair line 10. Spectrum analyzer 96 then measures the power spectrum of the entire 0.2 MHz to 30 MHz VDSL band over forward transmission path 12. Threshold detector 97 identifies all frequency bins with power level more than a specified amount above the noise floor and then passes this data to TCC 98, which determines the upper and lower cutoff frequencies of each RFI signal detected with more than a pre-specified power level above the noise floor. TCC 98 then formats and sends this RFI data to digital transmitter 102 for transmission over reverse transmission path 14 to VTU-O 4. The RFI data is received by digital receiver 62, decoded and extracted from the received bit stream by bit stream decoder 72, and passed to TCC 52. TCC 52 then turns line driver amplifier 50 back on, sets switch 26 "down", and sends an acknowledgment to VTU-R 20 that the RFI data has been received.

TCC 98 next sets switch 86 "up" to send received signals to demodulator 88. Then, after receiving the acknowledgment that the RFI data has been received by VTU-O 4, TCC 98 turns off line driver amplifier 124. TCC 52 then sets switch 76 "up" and activates spectrum analyzer 78 and threshold detector 79. Spectrum analyzer 78 then measures the spectrum of the entire 0.2 MHz to 30 MHz VDSL band over reverse transmission path 14, and threshold detector 79 identifies all frequency bins with power level more than a specified amount above the noise floor and then passes this data to TCC 52, which determines the upper and lower cutoff frequencies of each RFI signal detected with more than a prespecified power level above the noise floor. TCC 52 then formats and sends the data to digital transmitter 28 for transmission over forward transmission path 12 to VTU-R 20. This RFI data is received by digital receiver 82, decoded and extracted from the received bit stream by bit stream decoder 94 and passed to TCC 98. TCC 98 then turns line driver amplifier 124 back on, sets switch 100 "up", and sends an acknowledgment to VTU-R 4 that the RFI data has been received. On receiving the acknowledgment, TCC 52 sets switch 76 "down" to send received signals to demodulator 66.

Any of several possible spectral analysis algorithms, known to those skilled in the art, may be used in spectrum analyzers 78 and 96 without departing from the spirit and scope of the invention. In the preferred embodiment, the Welch method of spectral analysis (see Peter D. Welch, "The Use of Fast Fourier Transform for Estimation of Power Spectra: A Method Based on Time Averaging over Short, Modified Periodograms", *IEEE Transactions on Audio and Electroacoustics*, Vol. AU-15, No. 2, June 1967, pp.70) is used with a tapered data window such as a Hamming window. The threshold detectors 79 and 97 identify all spectral frequency bins with power level greater than a specified level above the local noise floor, which may vary over the entire 30 MHz-wide VDSL band. To do this, the output of the spectrum analysis is first converted to decibel units. The total spectrum is segmented into sections, for example, 1 MHz to 3 MHz wide. Over each section the local noise floor level is taken as the average of the power levels in the lowest N-th percentile of the spectral bins in the section, where N is selected to have a high probability of excluding spectral peaks due to interference. All bins with power levels of Δ dB or more above the computed noise floor are then identified as containing interference, and are flagged as such to the local TCC 52 or 98.

Next, TCCs 52 and 98 each select a spaced sequence of test frequencies spaced relatively uniformly over the entire 0.2 MHz to 30 MHz VDSL band, and chosen so that they avoid any narrow sub-bands containing RFI, as determined by the above mentioned spectral measurements. These test frequencies are to be sent sequentially as a series of tones of predetermined duration and with a predetermined separation in time. These tones are used to determine the attenuation versus frequency curves for the forward transmission path 12 and reverse transmission path 14.

First, the attenuation curve for the forward transmission path 12 is determined. To begin, TCC 52 in VTU-O 4 sends its list of test frequencies to TCC 98 in VTU-R 20. TCC 98 sends an acknowledgment back to TCC 52 that it knows the expected test frequency sequence, then sets switch 86 "down", sets switch 100 "up", and turns on spectrum analyzer 96. After receiving the acknowledgment, TCC 52 sets switch 26 "down", cutting off any input data bit stream from fiber-optic transmission line 2, and replacing it with a steady stream of zeros (a steady stream of ones would work just as well) generated by the TCC 52, so as to produce an unmodulated tone. The steady stream of zeros is encoded and modulated into a steady stream of identical baseband QAM symbols by symbol encoder & modulator 30. TCC 52 also issues a sequence of commands to digital local oscillator 34, tuning the latter to the selected sequence of frequencies, each frequency in turn. TCC 52 also sets the attenuation of stepped attenuator 46 to a minimum value that will not cause objectionable interference in other VSDL twisted pairs in the cable containing VSDL twisted-pair line 10.

For measurement of the transmitted power levels of the test tones, there are two options. In the first option, a small fixed fraction of the power out of line driver amplifier 50 in VTU-O 4 is sampled by directional coupler 51 and passed to power measurement device 53, which measures the power level, digitizes it, scales it up to the true total power level out of line driver amplifier 50, and sends the true measured power value to TCC 52. In the second option, which is the preferred embodiment, directional coupler 51 and power measurement device 53 are omitted. Instead, stepped attenuator 46 and line driver amplifier 50 are made of sufficiently stable and precise components that the output power as a function of the attenuator setting can be calibrated upon assembly of the VTU-O 4, and thereafter be relied upon to remain invariant for the lifetime of said VTU-O. The calibration curve is then permanently stored in TCC 52. The same is done for the corresponding components of VTU-R 20.

VTU-O 4 sends each test tone, in turn, to VTU-R 20, and stores the power level that each tone was transmitted at, as determined from either the attenuator calibration curve or power measurement device 53, depending upon the hardware configuration used. VTU-R 20 receives the test tone sequence and routes the test tone signals down to spectrum analyzer 96, which determines the received power spectrum and passes the power level for the bin containing the test tone to threshold detector 97. If the measured power level is above a threshold sufficient to discriminate it from noise, then the threshold detector sends the power measurement to TCC 98. If the power level in the bin is below the threshold, then the threshold detector 97 signals this fact to TCC 98. If a valid, reliable measurement was made, then TCC 98 sends the measured power level, via reverse transmission path 14, to TCC 52 in VTU-O 4. TCC 52 computes the attenuation at the tone frequency as the difference between the transmitted power level and the received power level (both in decibels), and measures and sends the next test tone. If the received power was below threshold, then TCC 98 sends a negative acknowledgment (NAK) signal to TCC 52. TCC 52 then reduces the attenuation of stepped attenuator 46, and retransmits the test tone at a higher power level, which is again stored. This process continues for all test frequencies on the forward path until the entire forward path attenuation curve has been mapped.

After the attenuation on the last test tone power measurement has been successfully made and the result transmitted to VTU-O 4, TCC 98 turns switch 86 up to route received signals through digital receiver 82, and sends its own list of test frequencies for the reverse transmission path 14 to TCC 52. TCC 52 sends an acknowledgment back to TCC 98 that it knows the expected test frequency sequence, then moves switch 76 to connect the signal path to spectrum analyzer 78, and turns on spectrum analyzer 78. After receiving the acknowledgment, TCC 98 generates a steady stream of zeros and sends it via switch 100 to digital transmitter 102. The steady stream of zeros is encoded and modulated into a steady stream of identical baseband QAM symbols by symbol encoder & modulator 104. TCC 98 also issues a sequence of commands to digital local oscillator 108, sequentially tuning the latter to the selected sequence of frequencies. TCC 98 also sets the attenuation of stepped attenuator 120 to as low a value as can be expected to not cause objectionable interference in other VSDL twisted pairs in the cable containing VSDL twisted-pair line 10.

VTU-R 20 then sends each test tone, in turn, to VTU-O 4, and stores the power level that each tone was transmitted at, as determined from either the attenuator calibration curve or power measurement device 128, depending in the hardware configuration used. VTU-O 4 receives the test tone sequence and routes the test tone signals up to spectrum analyzer 78, which calculates the received power spectrum and passes the power level for the bin containing the test tone to threshold detector 79. If the measured power level is above a threshold sufficient to discriminate it from noise, then the threshold detector sends the power measurement to TCC 52. If the power level in the bin is below the threshold, then the threshold detector 79 signals this fact to TCC 52. If a valid, reliable measurement was made, then TCC 52 sends the measured power level, via forward transmission path 12, to TCC 98 in VTU-R 20. TCC 98 computes the attenuation at the tone frequency as the difference between the transmitted power level and the received power level (both in decibels), and measures and sends the next test tone. If the received power was below threshold, then TCC 52 sends a negative acknowledgment (NAK) signal to TCC 98. TCC 98 then reduces the attenuation of stepped attenuator 120, and retransmits the test tone at a higher power level, which is again stored. This process continues for all test frequencies on the forward path until the entire reverse path attenuation curve has been mapped.

Figure 5A:
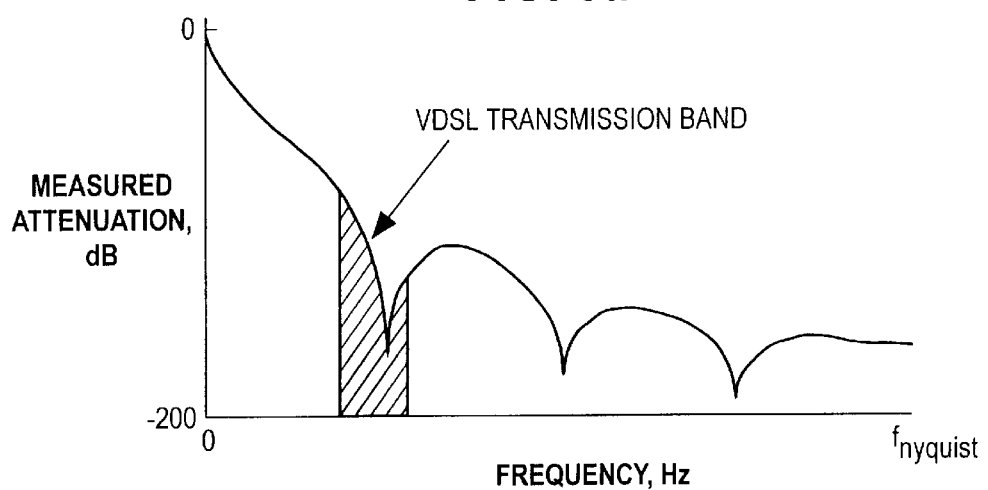
FIG. 5a is an illustration of a typical VDSL transmission line attenuation curve with a VDSL signal band spanning a bridged tap null.
Figure 5B:
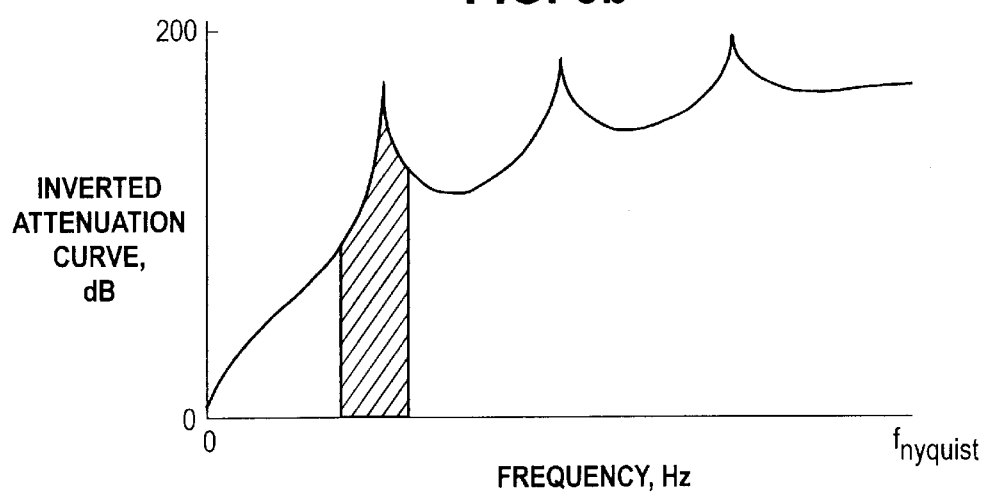
FIG. 5b shows the inversion of this attenuation curve resulting from the signal processing of the present invention.

After acquiring the attenuation curve data for the direction of transmission along VDSL twisted-pair line 10 away from the VTU in which each TCC is embedded, each TCC, 52 and 98, inverts the attenuation data (in decibels), so that an attenuation of −X dB, is replaced by a positive value of +X dB. Each TCC, 52 and 98, then interpolates its inverted attenuation data to obtain values on a finer frequency grid (for instance, 10 kHz). To reasonably approximate attenuation curves containing bridged tap nulls, the preferred embodiment uses a cubic spline interpolation procedure, although other types of interpolators could as well be used without departing from the spirit and scope of this invention. Each TCC, 52 and 98, then stores the results for subsequent use. A typical measured attenuation curve, including several bridged tap nulls, is illustrated in FIG. 5a, along with a typical VDSL signal transmission band that spans one of the nulls. FIG. 5b illustrates the corresponding inverted attenuation curve.

Figure 5C:
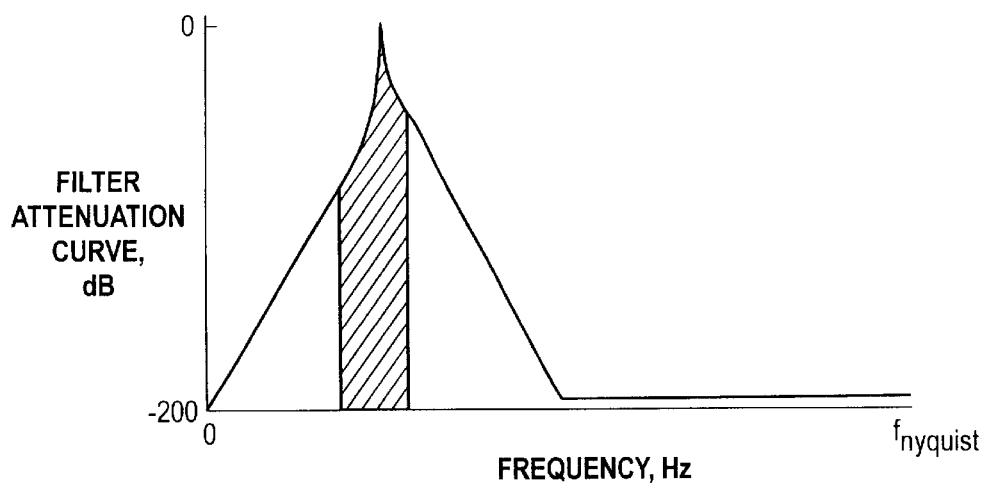
FIG. 5c shows the filter attenuation curve for a pre-emphasis filter designed in accordance with the method of the present invention.

Thereafter, whenever the transmission parameters (carrier frequency and/or bandwidth) of the VDSL signal in either direction are changed, the TCC of the transmitting VTU determines the upper and lower frequency limits of the new transmission band and determines the point within that band at which the interpolated inverted attenuation curve has maximum value. Denoting this maximum value by $x_{max}$, the value $x_{max}$ is subtracted from each interpolated inverted attenuation value, so that the resulting peak value is at 0 dB, and all other values are negative. These new values are the desired pre-emphasis filter frequency response levels. Additional frequency response values are determined outside the pre-emphasis filter transmission band, rolling off smoothly and gradually to large attenuations on either side in such a way as to not cause unnecessary ripples in the pre-emphasis filter transmission band, as illustrated in FIG. 5c. The TCC then converts the resulting frequency response values to linear units, $x=10^{X(dB)/10}$, where X(dB) is the value in decibels and x is the value in linear units, and sends these desired frequency response values to the filter design algorithm, 44 or 118, in the transmitting VTU.

The filter design algorithm 44 or 118 then determines the filter coefficients of a window-based digital finite impulse response (FIR) filter of predetermined length, with the filter frequency response constrained to pass through the desired points on the pre-emphasis filter transmission curve designed in the above manner by the associated TCC, 52 or 98. The values of the coefficients in the associated digital FIR filter 42 or 116 are then adjusted to match the values determined by the filter design algorithm 44 or 118. While FIR filters are used in the preferred embodiment of this invention, infinite impulse response (IIR) filters could instead be used without departing from the scope and spirit of the present invention. After the digital FIR filters 42 and 116 have been reconfigured in VTU-O 4 and VTU-R 20, then switch 26 is set "up" and switches 36 and 40 are set "down" in VTU-O 4, while switch 100 is set "down" and switches 110 and 114 are set "up" in VTU-R 20 to permit transmission of digital data in both directions between high-data-rate server 1 and high-rate terminals 22. To the extent that there remains any residual distortion uncorrected by the pre-emphasis filters 38 and 112, that residual distortion will be canceled by adaptive equalizers 90 and 68.

What is claimed is:

1. A method in a transmission medium for adaptively pre-emphasizing a transmitted signal, comprising steps of:
   (a) measuring an attenuation-versus-frequency characteristic of a transmitted signal over a predetermined bandwidth of a transmission medium channel;
   (b) determining an inverse of the measured attenuation-versus-frequency characteristic;
   (c) storing the inverted attenuation-versus-frequency characteristic;
   (d) designing filter coefficients for a pre-emphasis filter based on the stored inverted attenuation-versus-frequency characteristic;
   wherein the step (d) of designing filter coefficients for the pre-emphasis filter further comprises the steps of:
      (i) identifying a transmission band of said transmitted signal within said predetermined bandwidth;
      (ii) finding a frequency and maximum value of said inverses of the attenuation levels within said transmission band of said transmitted signal;
      (iii) subtracting said maximum value from each of said inverted attenuation levels so that a new resulting normalized peak value is at zero decibels, and all other normalized inverted attenuation levels within said transmission band are negative in decibels;
      (iv) designing a pre-emphasis filter template that matches said normalized inverted attenuation levels within said transmission band, said pre-emphasis filter rolling off to negative decibel transmission levels outside said transmission band; and
      (v) applying a digital filter design algorithm to determine filter weighting coefficients of a digital filter that matches said filter template; and
   (e) pre-emphasizing the transmitted signal such that a cascade of the pre-emphasis filter and the transmission medium channel has a substantially flat attenuation versus frequency curve.

2. The method according to claim 1 wherein said measuring step (a) is performed at system startup.

3. The method according to claim 1 wherein said measuring step (a) is performed when a configuration of the transmission medium channel is changed.

4. The method according to claim 1 wherein said steps (a) through (e) are repeated for both forward and reverse transmission directions of said transmission medium channel.

5. The method according to claim 1, wherein said transmission medium channel is a transmission line carrying either a high-speed digital subscriber line (HDSL), a very-high-frequency digital subscriber line (VDSL), an asymmetric digital subscriber line (ADSL), integrated services digital network (ISDN), a broadband ISDN (B-ISDN), or high-definition television (HDTV) signals.

6. The method according to claim 1, wherein said transmission medium channel is a satellite communication link having at least one satellite transponder connecting first and second ground stations at either end of a link.

7. The method according to claim 1, wherein the step (a) of measuring the attenuation-versus-frequency characteristic of the transmission medium further comprises a step of determining transmission frequencies and bandwidths of all interferers within an available transmission band using spectral analysis and further determining whether a received power level of each transmission frequency is above a specified threshold level.

8. The method according to claim 7 wherein said transmitted signal comprises a sequence of test tones spaced over the available transmission bandwidth and selected to avoid those frequency transmission bands of any interfering signal detected above said specified threshold level.

9. The method according to claim 1, wherein the step (a) of measuring the attenuation-versus-frequency characteristic of the transmission medium further comprises steps of:
   (f) measuring a transmitted power level of each of a plurality of transmitted test tones at a transmitter end of said transmission medium channel;
   (g) measuring a received power level of each of said plurality of transmitted test tones at a receiver end of said transmission medium channel;
   (h) transmitting a value of said received power levels from said receiver end back to said transmitter end; and
   (i) determining an attenuation at the frequency of each of said plurality of test tones by determining a ratio of the received to transmitted signal power levels.

10. The method according to claim 9, wherein the step (b) of determining the inverse of the measured attenuation-versus-frequency characteristic further comprises the steps of:
   (j) interpolating the measured attenuation-versus-frequency characteristic on a set of measurement points to calculate attenuation values on frequency values in between said measurement points; and
   (k) determining the inverses of the attenuation levels at said measurement points and at all interpolated frequencies between said measurement points.

11. The method according to claim 10, wherein the interpolation of said measurement points is done using a cubic spline interpolation function.

12. The method according to claim 1 wherein the step (e) of applying the pre-emphasis filter to pre-emphasize the transmitted signal further comprises the steps of:

(l) modifying the filter weighting coefficient values of said pre-emphasis filter to equal the values calculated in steps (i) through (v); and (m) passing a subsequent sequence of modulated values of said transmitted signal through said pre-emphasis filter for as long as said signal transmission band remains invariant.

13. An apparatus for automatically adaptively pre-emphasizing a transmitted signal over a transmission medium, said apparatus comprising:

means for measuring an attenuation-versus-frequency characteristic of the transmitted signal over a predetermined bandwidth of the transmission medium channel;

means for determining an inverse of the measured attenuation-versus-frequency characteristic;

means for storing the inverted attenuation-versus-frequency characteristic;

means for providing filter coefficients for a pre-emphasis filter based on the stored inverted attenuation-versus-frequency characteristic;

wherein the means of providing filter coefficients for the pre-emphasis filter further comprises:

(i) means for identifying a transmission band of said transmitted signal within said predetermined bandwidth;

(ii) means for finding a frequency and maximum value of said inverses of the attenuation levels within said transmission band of said transmitted signal;

(iii) means for subtracting said maximum value from each of said inverted attenuation levels so that a new resulting normalized peak value is at zero decibels, and all other normalized inverted attenuation levels within said transmission band are negative in decibels;

(iv) means for designing a pre-emphasis filter template that matches said normalized inverted attenuation levels within said transmission band, said pre-emphasis filter rolling off to negative decibel transmission levels outside said transmission band; and (v) means for applying a digital filter design algorithm to determine filter weighting coefficients of a digital filter that matches said filter template; and means for pre-emphasizing the transmitted signal such that a cascade of the pre-emphasis filter and the transmission medium channel has a substantially flat attenuation versus frequency curve.

14. The apparatus according to claim 13 wherein said transmission medium channel is a high speed digital subscriber line (HDSL).

15. The apparatus according to claim 13 wherein said transmission medium channel is a very high frequency digital subscriber line (VDSL).

16. The apparatus according to claim 13 wherein said transmission medium channel is an asymmetric digital subscriber line (ADSL).

17. The apparatus according to claim 13 wherein said transmission medium channel is an integrated services digital network (ISDN).

18. The apparatus according to claim 13 wherein said transmission medium channel is a broadband ISDN.

19. The apparatus according to claim 13 wherein said transmission medium channel is a satellite communication link having one or more satellite transponders coupled to first and second ground stations at each end of a link.

20. A communication system having a transmission channel for transmitting signals between first and second terminal units, said first terminal unit adaptively pre-emphasizing said transmitted signals to compensate for electrical characteristics of said transmission channel and said second terminal unit, said first terminal unit comprising:

a forward transmission path comprising:
   a digital transmitter selectively coupled for receiving a data signal, said digital transmitter encoding the data signal in a format suitable for transmission over said transmission channel;
   a pre-emphasis filter selectively coupled for either receiving said formatted data signal or bypassing said formatted data signal, said pre-emphasis filter having a filter design coupled thereto for providing a filter algorithm thereto; and a reverse transmission path comprising:
   a digital receiver for demodulating and decoding a received data signal;
   a bit stream decoder coupled to said digital receiver;
   a spectrum analyzer selectively coupled to receive said received data signal;
   a threshold detector coupled to said spectrum analyzer; and
   a control computer coupled to said digital receiver and said forward transmission path for coordinating and controlling operations therebetween such that said forward path provides test signals to said second terminal unit for spectrum analyzing the received data signal and further determining a power level thereof for designing said design filter algorithm for said digital filter for pre-emphasizing said formatted data signal, whereby the formatted data signal has a substantially flat spectrum when received by said second terminal unit.

* * * * *